(No Model.)
E. T. STARR.
ELECTRIC MOTOR AND DYNAMO ELECTRIC MACHINES.
No. 300,154. Patented June 10, 1884.
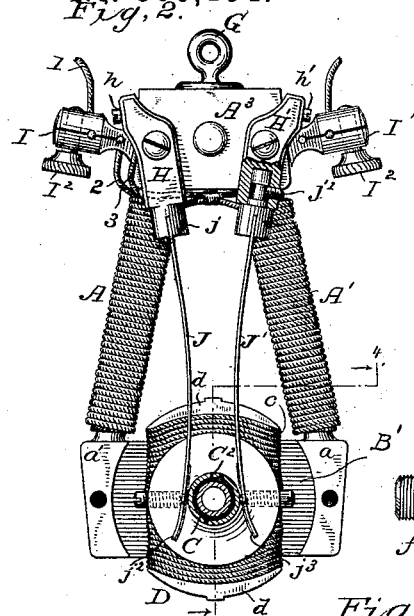
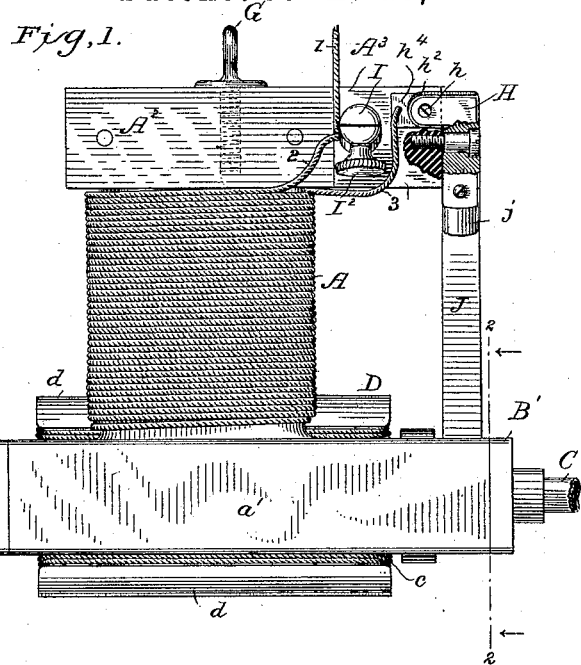
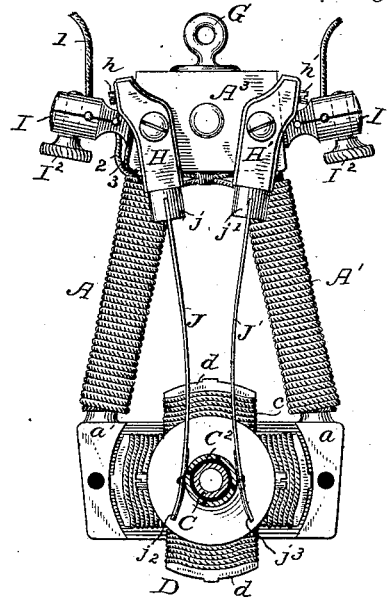
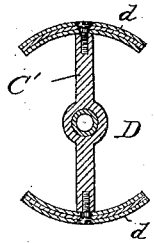
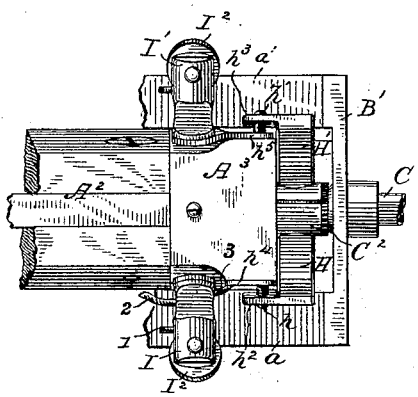
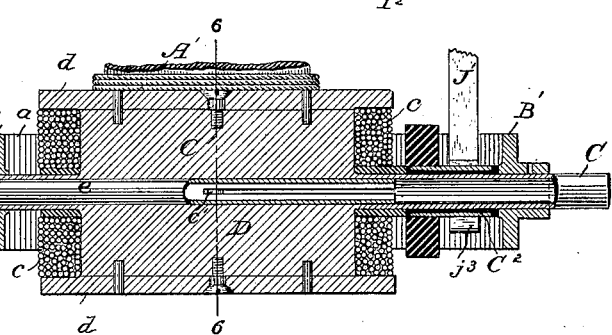
WITNESSES
Wm A. Skinkle
Geo. W. Young
INVENTOR:
Eli T. Starr,
By his Attorneys
Baldwin, Hopkins & Peyton

UNITED STATES PATENT OFFICE.

ELI T. STARR, OF PHILADELPHIA, PENNSYLVANIA, ASSIGNOR TO THE S. S. WHITE DENTAL MANUFACTURING COMPANY, OF SAME PLACE.

ELECTRIC MOTOR AND DYNAMO-ELECTRIC MACHINE.

SPECIFICATION forming part of Letters Patent No. 300,154, dated June 10, 1884.

Application filed December 4, 1883. (No model.)

*To all whom it may concern:*

Be it known that I, ELI T. STARR, of the city and county of Philadelphia, in the State of Pennsylvania, have invented certain new and useful Improvements in Dynamo-Electric Machines and Electric Motors, of which the following is a specification.

My invention relates to certain improvements in dynamo-electric machines and electro-magnetic motors, whereby their efficiency and durability are increased.

My invention is directed to improvements in the field-magnets, to improvements in the revolving armature, to improvements in the commutator-brushes and manner of mounting them, and to improvements in the binding-connections by which the machine is connected with the circuit-wires.

My improvements are also directed to the general arrangement and details of construction of the machine.

The subject-matter claimed will first be particularly set forth in detail, and will then be distinctly recited in the claims at the close of the specification.

In the accompanying drawings I have shown all my improvements as embodied in an electro-magnetic motor organized with special reference to imparting motion to a flexible driving-shaft and tool operated thereby, in order to constitute an automatically-driven dental engine. It will of course, however, be distinctly understood that some of my improvements may be used without the others, and in machines differing in construction from that particularly described and illustrated herein.

In said drawings, Figure 1 is a view in elevation of the motor, partly in section to show the pivotal connection of one of the commutator-brush arms. Fig. 2 is an end view thereof, with one of the bearings of the armature-shaft removed. Fig. 3 is a top or plan view of a portion of the motor, showing the insulated piece or connection for the commutator-brushes and binding-posts. Fig. 4 is a longitudinal section through the motor on the line 4 4 of Fig. 2, showing particularly the organization and connection of the flexible driving-shaft with the revolving armature and the connection of a flexible protecting-sheath for said shaft with the motor-frame. Fig. 5 is an end view similar to that of Fig. 2, with a different construction of armature, the said armature being shown as divided into four pole-pieces or magnets, with a correspondingly-divided commutator. Fig. 6 is a transverse section through the armature on the line 6 6 of Fig. 4.

The motor-frame consists of prolonged or extended pole-pieces $a$ $a'$ at the lower end of flat magnets A A', the upper ends of the flat-magnet cores being united together with an interposed plate, $A^2$, by means of detachable fastenings, whereby the winding of the magnet-cores with their insulated wire is facilitated. This winding would be somewhat difficult were the magnets A A' formed in one piece; but they can, of course, be so made. The opposite ends of the pole-pieces $a$ $a'$ of the prolonged or extended pole-pieces are connected by transverse end plates, B B', preferably of brass, in which the bearings for the armature-shaft C, which extends in the longitudinal line of said pole-pieces, are formed, the said armature-shaft being nicely fitted in said end bearings, so as to be capable of rapid revolution therein.

The armature D is preferably the well-known Siemens armature or bobbin, consisting of a flat bar, C', having two opposite longitudinal grooves, in which are wound the coils of wire $c$, the two ends of which are connected to the commutator $c^2$ on the end of the armature-shaft C, as usual. The armature-bar C' and shaft C are preferably made of one piece of metal.

Instead of making the curved pole-pieces $d$ $d$ of the armature D of one piece with the armature-bar C', I preferably construct said pole-pieces $d$ $d$ of the armature detachable and bolt them to the edges of the flat armature-bar, as clearly shown in Figs. 4 and 6. They are also preferably made of thin strips laid one on top of another, whereby pole-pieces are produced which are easily magnetized and demagnetized—a result which is very desirable. Said detachable pole-pieces $d$ $d$ of the armature D are united to the armature-bar preferably by means of suitable screws or bolts.

The armature-shaft C is a tubular shaft, and is provided with a driving-lug, $c'$, which projects into its bore, and is fitted to engage a longitudinal slot in the inner end of the stiff section $e$ of the flexible driving-shaft E. Said stiff section $e$ of said flexible driving-shaft E is inserted in the tubular armature-shaft, and by its connection with the driving pin or lug $c'$ of said armature shaft the flexible driving-shaft is connected with the armature, and when the armature is revolved said flexible driving-shaft will also be revolved to impart motion to an operating-tool connected to its outer end and mounted in a suitable hand-piece. (Not necessary to be shown.) As is usual with dental engines, the flexible drive-shaft is enveloped or surrounded by a flexible sheath or casing, F, the inner end of which is connected to a portion, $f$, of the motor-frame.

I prefer the flexible shaft and sheath to be those in common use with the well-known S. S. White dental engine, and as used with the electro-magnetic engine now being manufactured and sold by the S. S. White Dental Manufacturing Company, of Philadelphia, Pennsylvania. Said shaft and sheath are substantially the same as those described in Nelson Stowe's patent, Reissue No. 8,607, of March 4, 1879. The motor is shown as provided at its upper end with a hook or eye, G, whereby it may be readily suspended from a suitable overhead support when organized for use as the motor of a dental engine.

When the machine is used as a motor, the double magnet A A' is preferably wound with about one-half the length of the wire used in winding the armature, whereby the pole-pieces of the field-magnet have just sufficient strength to enable the armature to pull or push against them effectively, and whereby also to enable the pole-pieces to discharge or demagnetize quickly and entirely, so as to avoid the usual tendency of the magnet to retard the rotation of the armature after the current has been reversed.

Mounted at the upper end of the magnet A A', by connection, for instance, with the interposed plate $A^2$ between the upper ends of the magnet-cores, is an insulated piece or frame, $A^3$, upon which the binding-screws I I', connecting the circuit-wires, as well as the commutator-brush arms, are mounted. Said brush-arms H H' are pivoted upon the insulating-frame, so as to be capable of adjustment toward and from each other by means of set-screws $h\ h'$, passed through lateral extensions $h^2\ h^3$ of said brush-arms, which bear against conducting plates or strips $h^4\ h^5$, mounted upon the insulated frame $A^3$.

The commutator-brushes proper preferably consist of flat steel plates or strips J J', connected with the lower ends of the brush-arms H H' by means of swiveling or jointed connections $j\ j'$, whereby the flat faces of the commutator-brushes may accommodate themselves to and bear upon the commutator, and thus always present a firm broad surface connection between the brushes and the commutator, the pressure of said brushes upon the commutator being regulated by the adjusting-screws $h\ h'$, before described. It will thus be seen that the commutator-brushes may be adjusted to bear upon the commutator with any desired pressure, and that in order to give said brushes greater elasticity I prefer to construct them of strips of steel or similar elastic metal. I further prefer to face the lower ends of said brushes, which make contact with the commutator, with copper strips $j^2\ j^3$, or strips of other metal having superior conductivity. By this compound commutator-brush I thus obtain the desired elasticity with a surface which readily takes up the current.

As before stated, the brushes are adjusted to bear upon the commutator on the armature-shaft, and this produces mechanical pressure, which is transferred to the armature-shaft, and of course retards somewhat the revolution of the armature; but this retardation or mechanical friction is more than overcome by the reduced electrical resistance, and an increase of electrical power is therefore attained, the brushes being made to swivel, so that they are entirely free to lie flat upon the commutators, and thus produce a perfect contact.

The binding-posts I I' are preferably split posts having two holes drilled through them—one being for the reception of the line or circuit wire, and the other terminating the division or split of the post—the construction being such that with a reduction in the sides of the post the members thereof have a tendency to spring apart, while they may be readily contracted upon the wire which is inserted through the post by means of a binding-screw, $I^2$.

I have found in practice that the ordinary binding-screws are defective in their tendency to work loose, and in the defective contact which they provide, the resistance thus ensuing causing a waste of power. I do not wish to be understood as claiming in this application the improved binding-post described herein by me, as it forms the subject-matter of another application of mine filed February 20, 1884, No. 121,371. In this particular instance the current which drives the motor passes through the line-wire 1 to the binding-post I; from thence by way of wire 2 to the magnet-wires, through which the current passes in order to energize the magnets; thence by way of wire 3 to contact-plate $h^4$ upon the side of the insulated frame $A^3$ upon which the adjusting-screw $h$ of the brush-arm H rests; then through said brush-arm and its brush to one plate of the commutator, through the commutator, through the armature-coil to the opposite plate of the commutator; then to the commutator-brush J' and brush-arm H' to a contact-plate, $h^5$, and from said plate to line by way of the binding-post I'.

I have thus described my several improvements as organized in the best way now known to me, and without elaborating the advantages of my improvements, which will be understood by skillful electricians, I will state my claim herein to be as follows, first premising that the commutator-brush faced where it makes contact with the commutator with a different material from that of the brush, and the making of the field magnet or magnets of less strength than the armature, as described but not claimed herein, will be duly claimed by me in another application to be hereafter filed:

1. The improved armature having pole-pieces made up of thin plates or strips connected together and to the armature shaft or bar, substantially as described.

2. The combination of the motor-frame, the tubular armature, the flexible driving-shaft fitted in said armature and connected therewith so as to be driven thereby, and the sheath or cover for said shaft connected with an extension of the motor-frame, substantially as described.

3. A commutator-brush loosely jointed or swiveled to accommodate itself to the commutator-shaft, substantially as described.

4. A brush-arm jointed so as to be adjustable in its pressure upon the commutator, and provided with a loosely-jointed or swivel commutator-brush, substantially as described.

5. The combination of the brush-arm, the adjusting device thereof, and the loosely-jointed or swivel commutator-brush, consisting of a flat plate or strip, substantially as described.

In testimony whereof I have hereunto subscribed my name this 26th day of November, A. D. 1883.

ELI T. STARR.

Witnesses:
E. EUGENE STARR,
GEO. VINSON, Jr.